May 15, 1962   K. R. THOMSON   3,034,621
SINGLE-REVOLUTION CLUTCH
Filed July 6, 1959   3 Sheets-Sheet 1

INVENTOR
Kenneth Richard Thomson
BY
Watson, Cole, Grindle & Watson
ATTORNEY

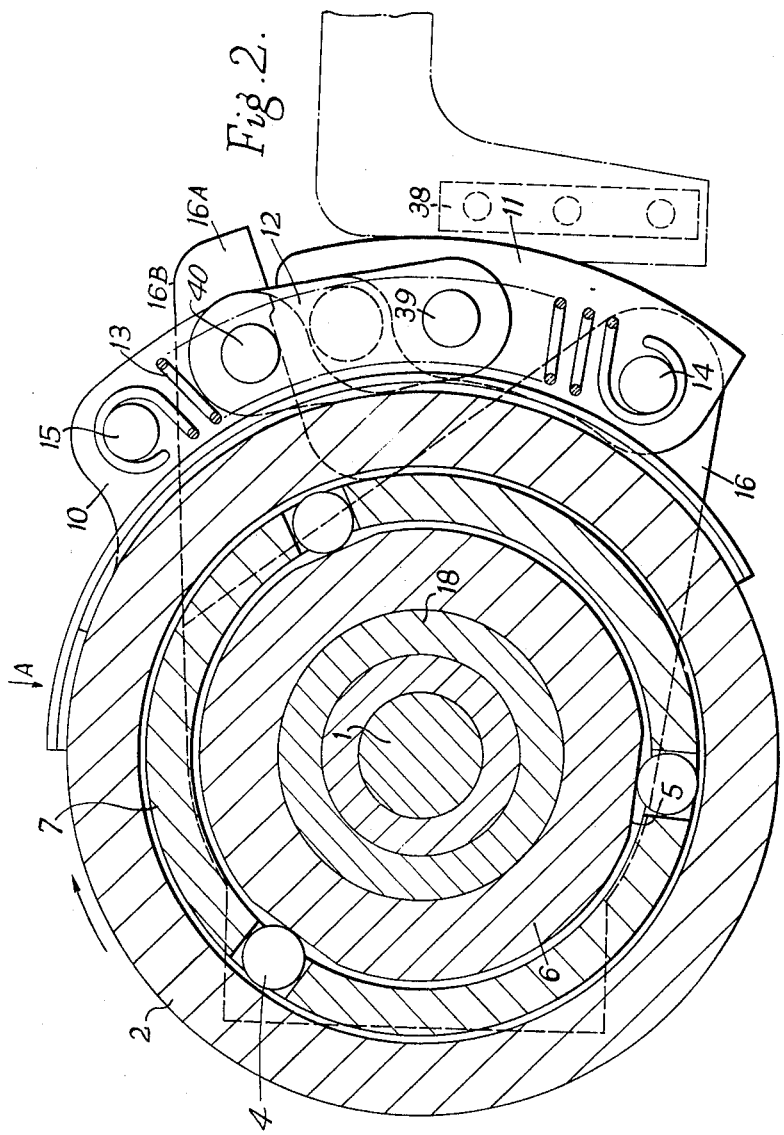

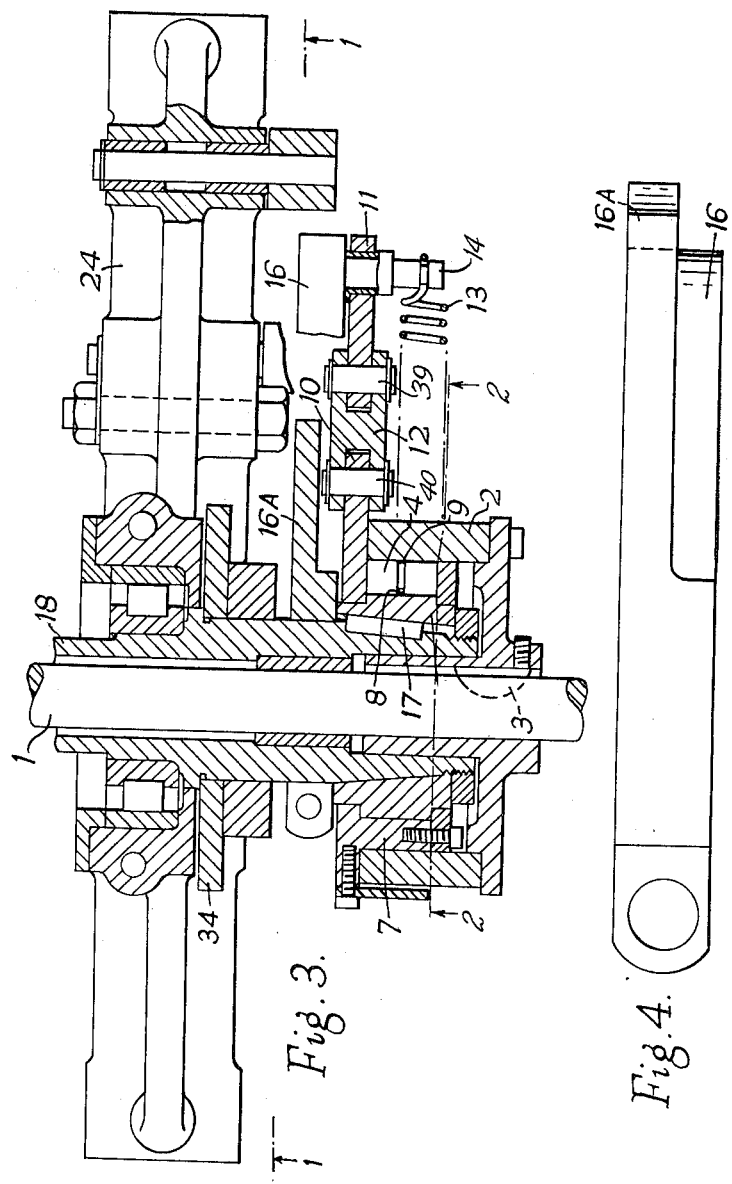

United States Patent Office 3,034,621
Patented May 15, 1962

3,034,621
SINGLE-REVOLUTION CLUTCH
Kenneth Richard Thomson, Bristol, England, assignor to The Thrissell Engineering Company Limited, Bristol, England, a company of Great Britain
Filed July 6, 1959, Ser. No. 825,259
Claims priority, application Great Britain July 21, 1958
4 Claims. (Cl. 192—27)

This invention concerns an improved single-revolution clutch. Single-revolution clutches are well-known and are used in many different kinds of machines to drive a machine through a single cycle of operations on engagement and to be disengaged at the end of the cycle.

The clutching devices employed in the present clutch are of the known wedging rolling-member type and, in the construction described later, the rolling members are cylindrical, that is, rollers.

According to the invention there is provided a single-revolution clutch having clutching devices of the wedging rolling-member type and comprising a cage for the rolling members having an arm whereby the cage may be rotated, a pair of toggle links connecting said arm to another arm fixed to the driven member of the clutch, and a spring extending between said arms tending to draw them together by causing a toggle-collapsing movement whereby the cage is rotated and the clutch is engaged, and means for pressing the toggle elbow at the end of a driving revolution of the clutch to straighten the toggle against the influence of the spring to cause the cage to rotate and free the rolling members from driving engagement so that the clutch disengages.

The toggle pressing means may comprise a pivoted lever adapted, in one position, to engage the toggle elbow, the lever being kept in said position by a detent having means associated therewith to release the lever when it is desired to engage the clutch. Said release means may comprise an electro-magnet coupled to the detent to cause it to move out of lever-engaging position.

A detent devices such as a sprung roller cooperating with a grooved disc rotatable with the driven member of the clutch may be provided to prevent overrun.

The invention will be described by way of example with reference to the accompanying drawings, in which:

FIGURE 2 is a sectional view on line 2—2 of FIGURE 3 showing the clutch itself, drawn to a larger scale, with certain clearances exaggerated to render the showing clear.

FIGURE 3 is a sectional plan, with a toggle and some associated parts laid out flat to show the construction more clearly.

FIGURE 4 is an end elevation of a detail of FIGURE 2.

Figure 1:
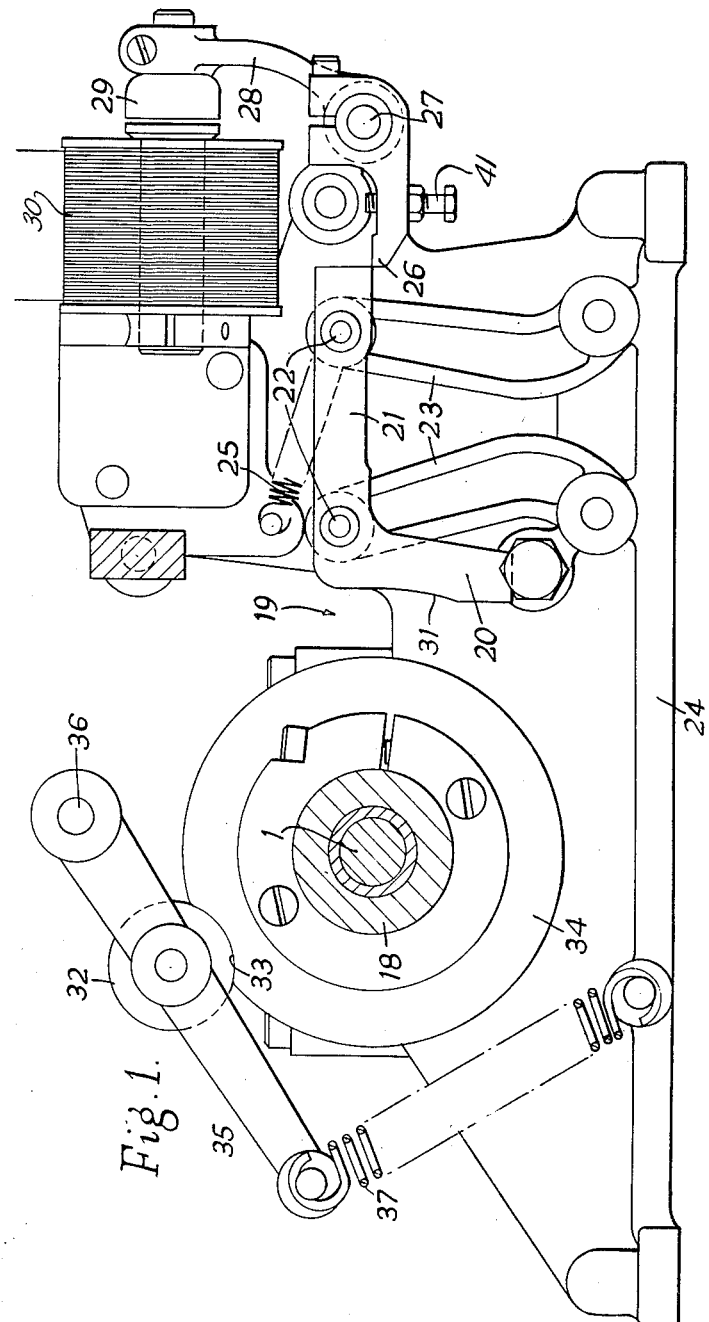
FIGURE 1 is an end elevation showing part of the clutch, and its tripping mechanism, the view being a section on 1—1 FIGURE 3.

Referring to the drawings, 1 is the driving shaft which rotates in the direction of the arrow shown in FIGURE 2. A clutch driving member 2 is keyed to the shaft 1 as shown at 3, FIGURE 3. Rollers 4 constitute the rolling members of the clutch and these are shown in FIGURE 2, contacting flats 5 on a clutch driven member 6. As shown in FIGURE 2 the rollers are touching the flats at about the middle of their length and the clutch is then disengaged.

The rollers are kept at their 120° spacing by a cage 7 and to hold the rollers against the flats each roller has a small groove 8, FIGURE 3, in it and a thin wire spring or circlip 9 extends round the three rollers, lying in the groove, to cause the rollers to embrace the clutch driven member. The cage 7 has an operating lever 10 integral with it.

Clutch engagement and disengagement are effected by a toggle device comprising links 11 and 12, and a spring 13. The spring extends from a pin 14 on a lever 16 to which the link 11 is pivoted, to a pin 15 on the cage lever 10 to which the link 12 is pivoted at 40.

The lever 16 is clamped to a sleeve 18, referred to below so as to provide adjustment. Another arm 16A extends from the lever body and this arm has a rounded edge at 16B. If the elbow of the toggle, that is, the part near the toggle pivot 39, is pressed so that the toggle assumes the position shown in FIGURE 2 the cage 7 is rotated relatively to the driven member 6, and the clutch is disengaged, while if the elbow is free to move outwards under the pressure of spring 13 and the lever 10 will move and carry the cage around and cause the rollers to roll on the flats until they wedge between the members 2 and 6. The clutch is thus engaged and the whole of mechanism shown in full lines in FIGURE 2 and so far described, rotates with the driving shaft 1. The driven member 6 is keyed at 17 to the above-mentioned sleeve 18 which surrounds the shaft 1 and any member to be driven through the clutch may be fixed on this sleeve which extends upwards from the position shown in FIGURE 3 for any desired length.

Clutch engagement and disengagement are controlled in the following manner:

A control device is provided consisting of a striker 19, FIGURE 1, having two arms 20 and 21 nearly at right angles to one another. The striker is shown in the position it would occupy when the clutch parts are in the position shown in FIGURE 2 but some of the parts are omitted from FIGURE 1 for clearness. The arm 21 is pivoted at 22 to a pair of links 23 which are in turn pivoted to the frame 24 on which the clutch is supported. A spring 25 attached to the frame and to the rear pivot 22 tends to pull the striker 19 to the left, in FIGURE 1. A detent 26 pivoted at 27 is provided, whose free end can engage the rear end of the arm 21 of the striker and prevent it from moving to the right from the position shown in FIGURE 1. The detent can be swung anticlockwise on its pivot to release the arm 21, by a lever 28 which has attached to it an armature 29, and a magnet coil 30, when energised, can attract the armature and cause the detent to disengage from the arm 21.

The arm 20 of the striker has a concave curve 31 on its face concentric with the axis of the shaft 1 when the parts are in the position shown in FIGURE 1 and the radius of curvature is substantially that of the toggle link 11. The arm 20 has a block 38, FIGURE 2, fixed to it for a purpose described later.

While, as explained later, disengagement of the clutch is effective and accurate, a roller detent is provided as an additional device to further check the sleeve 18 when the clutch disengages and to ensure that the sleeve 18 returns to an exact position at the end of each revolution. This detent comprises a roller 32 which can engage a concave recess 33 in a disc 34, which is clamped to the sleeve 18, the roller being carried on a lever 35 pivoted at 36 to the frame. The lever is drawn downwards by a spring 37 so that when the clutch is rotating the roller 32 rides on the periphery of the disc 34 until the concave recess reaches the roller and the latter drops into the recess under the pressure of the spring 37 and restrains the sleeve 18 against further movement. When the clutch restarts, the roller 32 is forced out of the recess 33 by the driving force.

In operation, the shaft 1 is continuously driven and when it is desired to engage the clutch, the magnet coil 30 is energized, for example by a signal received from some other part of the machine embodying the clutch. The detent 26 is swung down and the pressure of spring 13 operates the toggle, the elbow of which merely pushes the arm 20 to the right by causing a swinging movement of the links 23, against the influence of the spring 25, which is relatively weak. As the toggle operates, the pin 15 moves towards the pin 14 and the resulting rotation of the lever 10 rotates the cage 7 and carries the rollers 4 into clutch engaging position where they wedge between the flats 5 and the interior of the driving member 2. The driven member 6 is thus caused to rotate with member 2 and the sleeve 18 rotates and sets any devices mounted on it into operation.

As soon as the signal to magnet 30 ceases (and in a particular machine to which the clutch is fitted the signal lasts only a small fraction of a second) the detent 26 and lever 28 will be free to turn clockwise on pivot 27 because the toggle will have moved clear of arm 20 when the clutch has rotated through a sufficient angle and then the spring 25 will pull the arm 21 to the left so that the end of detent 26 can move upward. This will happen because the lever 28 and the armature 29 are much heavier than the detent 26 and the three parts will rotate clockwise under the influence of gravity and the end of the detent will be in position to check undue movement to the right FIGURE 1, of arm 21. The upward movement of detent 26 can be checked by a stop screw 41.

When the parts shown in full lines in FIGURE 2 have rotated through nearly 360° the outside curve of link 11 will run against the concave part 31 of arm 20 and continued movement will tend to push the striker to the right. This movement is resisted by the detent 26 and so the toggle starts to straighten, stretching the spring 13. By the time the pivot 39 of the toggle reaches the position shown in FIGURE 2 the toggle will have become "straightened-out," that is, so far as the structure shown will permit, and the consequent movement of the cage relatively to lever 16 will once more shift the rollers and disengage the clutch.

The second arm 16A on lever 16, together with the stop-block 38 are provided to prevent the clutch from driving the sleeve 18 continuously in the event of fracture of spring 37, or any other cause that can enable the trailing end of toggle link 11 to pass beyond the end of concave curve 31 on arm 20 at the end of a cycle. The contact of 16A on 38 provides an audible knock to attract the attention of the operator.

What I claim as my invention and desire to secure by Letters Patent is:

1. A single-revolution clutch of the kind having a driving member and a driven member and clutching devices of the wedging rolling-member type between said members and comprising a cage for the rolling members having an arm whereby the cage may be rotated, an arm fixed to the driven member of the clutch, a pair of toggle links connecting said arms together, and a spring extending between said arms adapted to draw them together by causing a toggle-collapsing movement whereby the cage is rotated and the rolling members are forced into engagement with the driving and driven members and the clutch is engaged, and means for pressing the toggle elbow at the end of a driving revolution of the clutch to straighten the toggle against the influence of the spring to cause the cage to rotate and free the rolling members from driving engagement so that the clutch disengages.

2. A clutch as claimed in claim 1 having toggle-pressing means comprising a pivoted lever adapted, in one position, to engage the toggle elbow and straighten the toggle, and a detent for holding the lever in said position, said detent having means associated therewith to cause it to move and release the lever when it is desired to engage the clutch.

3. A clutch as claimed in claim 2 comprising an electromagnet coupled to the detent to cause it to move out of lever-engaging position when the magnet is energised.

4. A clutch as claimed in claim 1 comprising a disc rotatable with the driven member of the clutch having a recess in its periphery and a roller detent arranged to engage in this recess at the end of a revolution of the clutch, to prevent overrun of the driven member.

References Cited in the file of this patent

UNITED STATES PATENTS

| | | |
|---|---|---|
| 1,875,858 | Doring | Sept. 6, 1932 |
| 2,089,807 | Mottlau | Aug. 10, 1937 |
| 2,140,737 | Dickens | Dec. 20, 1938 |
| 2,633,957 | Gardinor et al. | Apr. 7, 1953 |
| 2,644,560 | Kleinschmidt | July 7, 1953 |

FOREIGN PATENTS

| | | |
|---|---|---|
| 367,392 | Great Britain | Feb. 19, 1932 |